(12) United States Patent
Wilkie, II et al.

(10) Patent No.: US 6,215,654 B1
(45) Date of Patent: Apr. 10, 2001

(54) SWITCHGEAR ASSEMBLY WITH INTEGRAL CONTROL WIRING WIREWAY

(75) Inventors: William Edward Wilkie, II, Fletcher; Douglas Kim Frantz, Hendersonville; Neal Edward Rowe, Asheville; John Bartholomew, Hendersonville, all of NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/325,308

(22) Filed: Jun. 3, 1999

(51) Int. Cl.[7] ............................... H02B 5/00; H02B 1/20
(52) U.S. Cl. ......................... 361/605; 218/156; 361/828
(58) Field of Search .............................. 200/50.21, 50.23; 218/155–158; 361/605, 608, 611, 614, 637–640, 675, 724–726, 826–828

(56) References Cited

U.S. PATENT DOCUMENTS

| | | | |
|---|---|---|---|
| 3,142,003 | * | 7/1964 | Olashaw ............................... 361/608 |
| 3,626,253 | * | 12/1971 | Sturdivan ............................. 361/608 |
| 4,504,885 | * | 3/1985 | Yoshikawa et al. ................. 361/614 |
| 4,602,313 | * | 7/1986 | Takahashi ............................ 361/614 |
| 5,508,891 | | 4/1996 | Rowe et al. . |
| 5,574,624 | | 11/1996 | Rennie et al. . |
| 5,689,097 | | 11/1997 | Aufermann et al. . |
| 5,761,797 | | 6/1998 | Besserer et al. . |

OTHER PUBLICATIONS

Cutler–Hammer, Instructions for DSII Metal–Enclosed Low–Voltage Switchgear Assemblies with DS Breakers, Feb. 1998, 37 pp.

* cited by examiner

Primary Examiner—Gregory Thompson
(74) Attorney, Agent, or Firm—Martin J. Moran (57) ABSTRACT

A switchgear assembly in which a number of cells housing electrical switching apparatus such as circuit breakers are vertically stacked in a forward compartment has combined arc shield/wire trays between cells for terminating secondary wiring for easy access through front doors on the switchgear assembly and for protecting the secondary wiring from circuit breaker arc gases. The arc gases are deflected by an upwardly and rearwardly inclined panel forming the back wall of the wire tray. A vertical wall forward of the inclined panel mounts a lower horizontal row of terminal blocks forward of an upper row. A wireway has a vertical section in a forward corner of the cabinet beside the vertically stacked cells which communicates with the wire trays, and a horizontal section extending rearward under the top wall of the cabinet. An inclined gutter provides a transition between the top of the vertical section and the forward end of the horizontal section. External wiring enters the wireway either through a bottom access opening aligned with the vertical section or a top access opening in the horizontal section. A depending lip on the rear of the arc shield diverts the arc gases laterally into a vertical chamber behind the vertical section of the wireway for expansion and cooling.

14 Claims, 6 Drawing Sheets

SWITCHGEAR ASSEMBLY WITH INTEGRAL CONTROL WIRING WIREWAY

BACKGROUND OF THE INVENTION

Cross Reference to Related Application

Commonly owned, concurrently filed U.S. patent application entitled "Combined Arc Shield/Wire Tray For Switchgear and Switchgear Assemblies Incorporating Same" and identified by Ser. No. 09/325,514.

1. Field of the Invention

This invention relates to switchgear used in low voltage electric power distribution systems, and more particularly, to an arrangement for routing and protecting control wiring within the switchgear cabinet.

2. Background Information

Switchgear for electric power distribution systems includes electrical switching apparatus and their line and load terminations together with related equipment mounted in metal cabinets. Switchgear used in sections of electric power distribution systems operating at voltages up through 600 volts is classified as low voltage switchgear. Typically, the electrical switching apparatus is a circuit breaker, but other switching apparatus such as for instance, network protectors, disconnect switches and transfer switches are also mounted in such switchgear cabinets. Henceforth, the electrical switching apparatus will be referred to as circuit breakers, although it will be understood that other types of electrical switching apparatus can be used as well.

Typically in such low voltage switchgear, multiple circuit breakers are mounted in each cabinet in cells stacked vertically in a forward compartment. The line and load conductors are mounted in rearward compartments and engage the circuit breakers through quick disconnects as the circuit breakers are installed in the cells.

Power circuit breakers can generate significant amounts of arc gases when interrupting large currents such as those associated with a short circuit in the distribution system. It is common for the arc gases to be vented through the rear of the circuit breaker. Other power circuit breakers discharge the gases through vents in the top of the circuit breaker housing. Generally, the approach is to slow the arc gases down and cool them before they leave the switchgear cabinet.

Other considerations in the design of low voltage switchgear is the placement of the terminals for the secondary wiring, such as the control and instrumentation wiring (normally at 120 volts). Generally, there is not much room for this secondary wiring terminations within the circuit breaker cabinet. One approach is to terminate the secondary wiring in the rear of the switchgear cabinet. However, this can expose personnel tending the secondary terminations to power conductors (normally at 480 or 600 volts) which are located there.

It is preferable to have the secondary wiring terminations at the front of the switchgear cabinet both for safety and accessibility. Hence, one approach has been to mount the secondary terminations alongside the circuit breakers. However, such space is very limited in the typical switchgear cabinet which is of standardized width.

Another approach has been to use an entire cell for terminations. Obviously this limits the number of circuit breakers that can be mounted in a switchgear cabinet. In some switchgear, the secondary terminations are mounted on trays which slide between the vertically mounted cells. In one arrangement, the trays pull out horizontally and then swing vertically for better access. One non-domestic manufacturer has fixed mountings for secondary terminations between the cells.

Placing the secondary terminations between the circuit breakers and accessible from the front of the cabinet must include protection of wiring from the arc gases discharged from top vents. The non-domestic manufacturer referred to above utilizes a rectangular channel extending transversely above the top vents to deflect the arc gases out sideways. The fixed secondary terminations are then mounted separately in front of the transverse channel.

The switchgear utilizing the pull out trays have a flat, horizontal arc shield at the top of the cells above the top vents. In some switchgear, this type of flat horizontal shield also extends under the pull out tray which is forward of the top vents. In this arrangement, where the pull out tray swings vertically after being pulled out, the flat wall is lower under the tray and there is an inclined transition section to this lower forward section. However, this is well in front of the arc vents. The switchgear also has flanges extending downward along the side edges of the flat ceiling panel.

The secondary or control wiring for low voltage switchgear assemblies includes factory-installed wiring which, in general, connects the circuit breakers with instrumentation also mounted in switchgear assembly and with each other for certain modes of operation. The field wiring, in general, is the wiring provided by the user of the switchgear for remote monitoring and control of the switchgear operation. Typically, the factory-installed wiring and the field-installed wiring interface at secondary wiring terminations. This factory-installed and field-installed secondary or control wiring should be easily accessible and protected from arcing gases. It should also not expose those servicing the secondary or control wiring to the power circuits within the switchgear assembly.

There is a need, therefore, for improved switchgear assembly, and especially for improved arrangement for routing and protecting the secondary or control wiring.

SUMMARY OF THE INVENTION

This need and others is satisfied by the invention which is directed to a switchgear assembly which includes a cabinet with a forward compartment having a plurality of vertically stacked cells in which electrical switching apparatus can be housed. The switchgear assembly further includes secondary wiring for the electrical switching apparatus, at least some of which extends outside the cabinet. This secondary wiring is routed through a wireway which has a vertical section in the forward compartment of the cabinet and which communicates with the cells. Preferably, this vertical section of the wireway extends along side the cells and most preferably in a forward corner of the forward compartment of the switchgear assembly cabinet. With this arrangement, doors which provide access to the cells also provide front access to the vertical section of the wireway.

The wireway also includes a horizontal section communicating with the vertical section and extending rearward into at least one additional compartment behind the forward compartment. This horizontal section extends under the top wall of the cabinet. Preferably, an inclined gutter section of the wireway provides a transition between the vertical section and the horizontal section.

The external wiring can enter the wireway through a bottom access opening in a floor panel of the cabinet which is aligned with the vertical section of the wireway. Alternatively, access is gained through a top access opening in a top panel of the cabinet into the horizontal section of the wireway. When not used, the bottom and top access openings are covered with a removable bottom cover and a removable top cover, respectively.

Where the vertical section of the wireway is in a forward corner of the switchgear cabinet, a chamber for expansion of arc gases generated by the electrical switching apparatus is provided behind this vertical section. Preferably, a transverse wall in the cabinet forms a rear wall of the vertical section of the wireway and a forward wall of the expansion chamber.

The wireway has a first wall with first attachment means for attaching the factory-installed wiring and a second wall with second attachment means for attaching the field-installed wiring. Preferably, these first and second attachment means comprise lanced sections of the respective walls.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
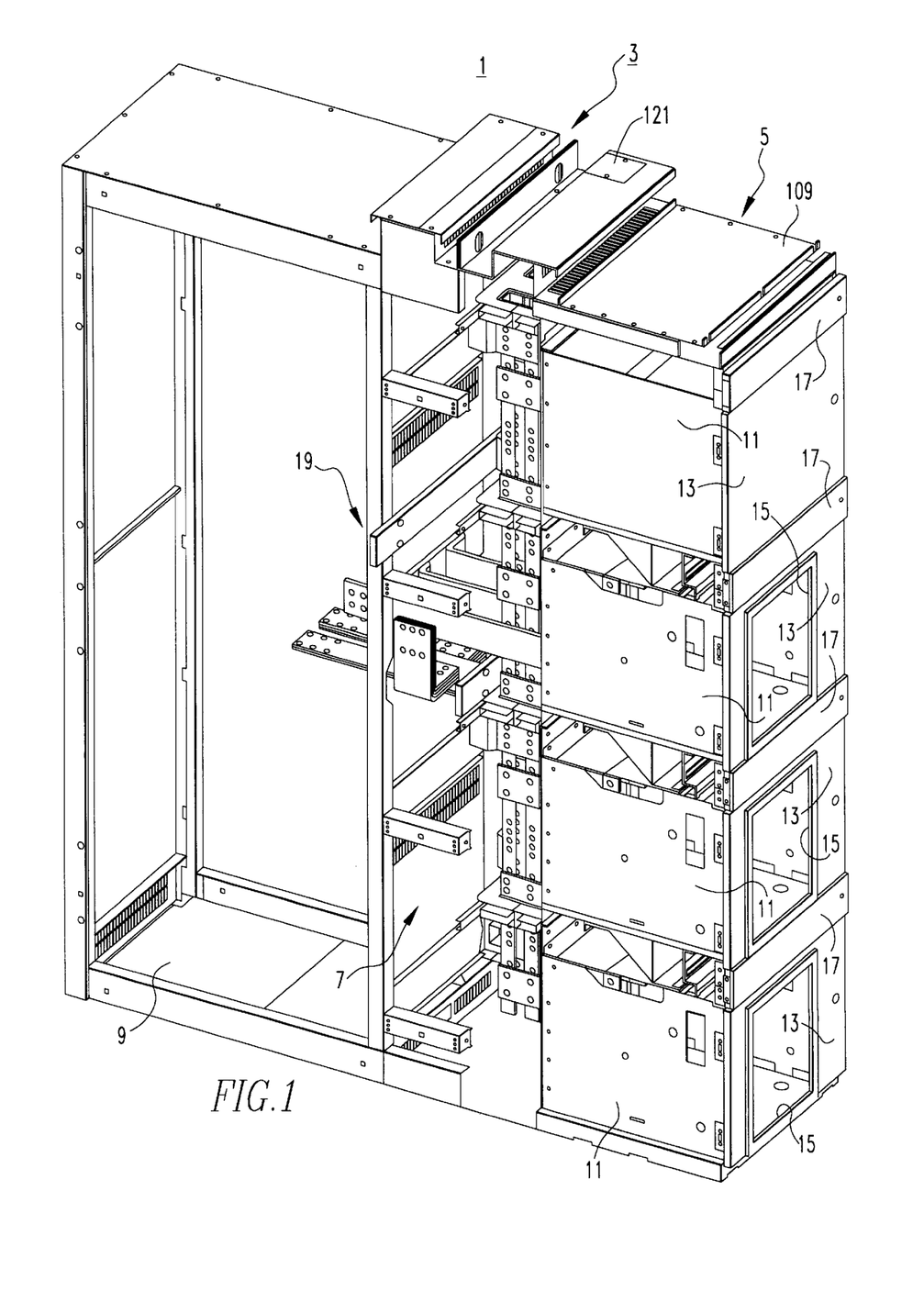
FIG. 1 is an isometric view of a switchgear assembly incorporating the invention shown with side panels removed for clarity.

FIG. 1 illustrates switchgear apparatus 1 which includes a switchgear cabinet 3 having a forward compartment 5 and additional compartments including a middle compartment 7 and a rear compartment 9. The forward compartment 5 has a number, in this case four, vertically stacked cells 11 for housing electrical apparatus. Typically, the electrical apparatus is circuit breakers and associated instrumentation, but other switching apparatus such as, for instance, network protectors, disconnect switches and transfer switches can also be mounted in the cells 11. Each of the cells 11 has a side hinged access door 13, the lower three of which have openings 15 through which the controls of the circuit breaker or other switching apparatus are accessible without opening the door. In the usual arrangement, the upper cell 11 houses instrumentation for the circuit breakers in the cells below and does not have an access opening. Low, wide side hinged doors 17 provide access to wiring terminations to be described below for the circuit breakers.

The middle compartment 7 houses three-phase power buses 19 connected to the circuit breakers (not shown) mounted in the cells 11. The rear compartment 9 houses connections (not shown) for power cables (also not shown) for connection to the circuit breakers in a manner which is well-known.

Figure 5:
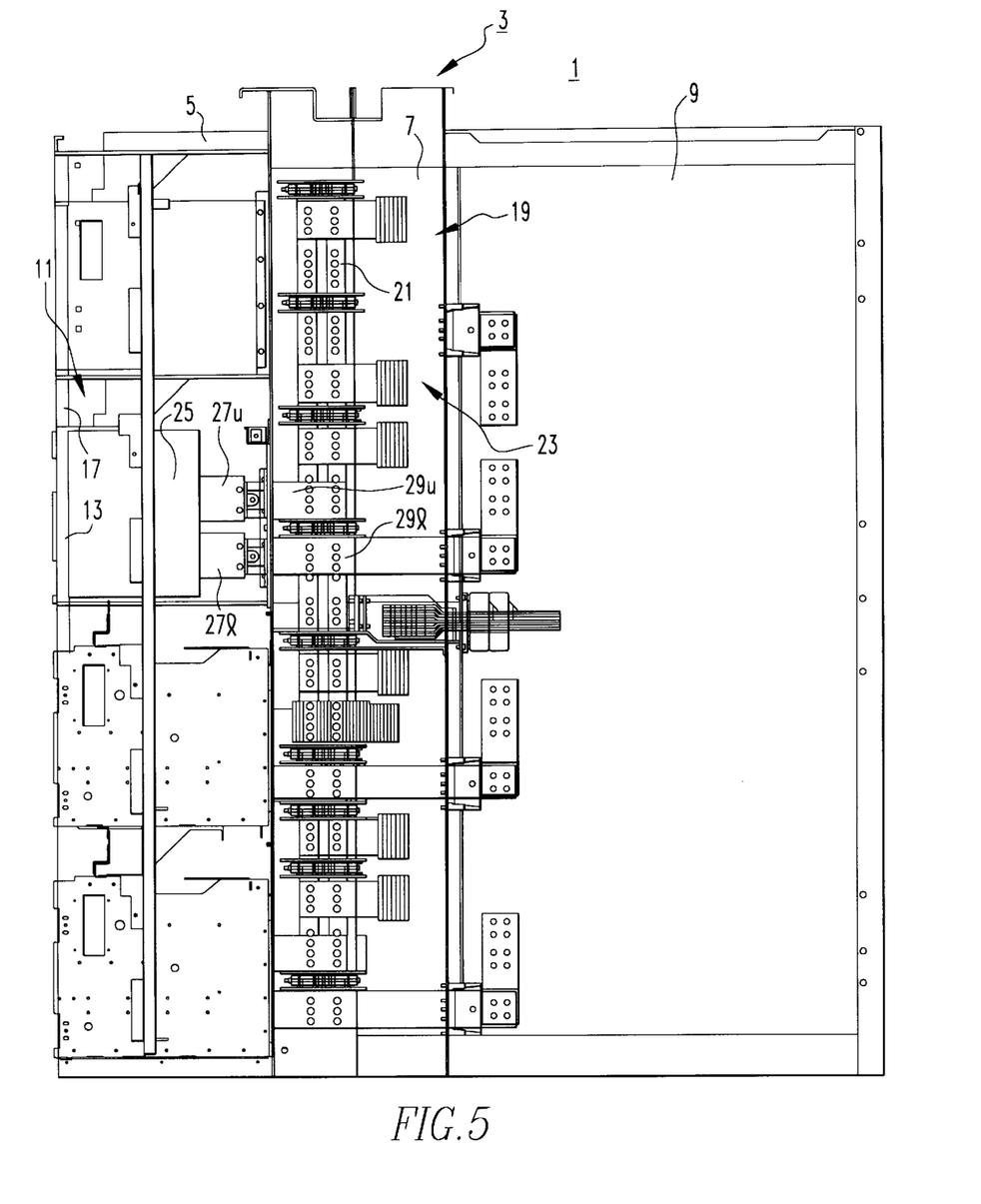
FIG. 5 is a vertical sectional view through the switchgear assembly.

As shown in FIG. 5, the power buses 19 include a set of vertical buses or risers 21 connected to horizontal buses 23. The circuit breakers 25 are inserted into the cells 11 through the open doors 13 (see FIG. 1) on cassettes (not shown) which roll the circuit breakers into position. The circuit breakers 25 have upper and lower quick disconnects 27u and 27l which engage stab connections 29u and 29l as the circuit breakers 25 are fully inserted in the cells 11. The upper stabs 29u are connected to the risers 21 while the lower stabs 29l become runbacks which extend through the middle compartment into the rear compartment 9 for connection to the power cables (not shown).

Figure 2:
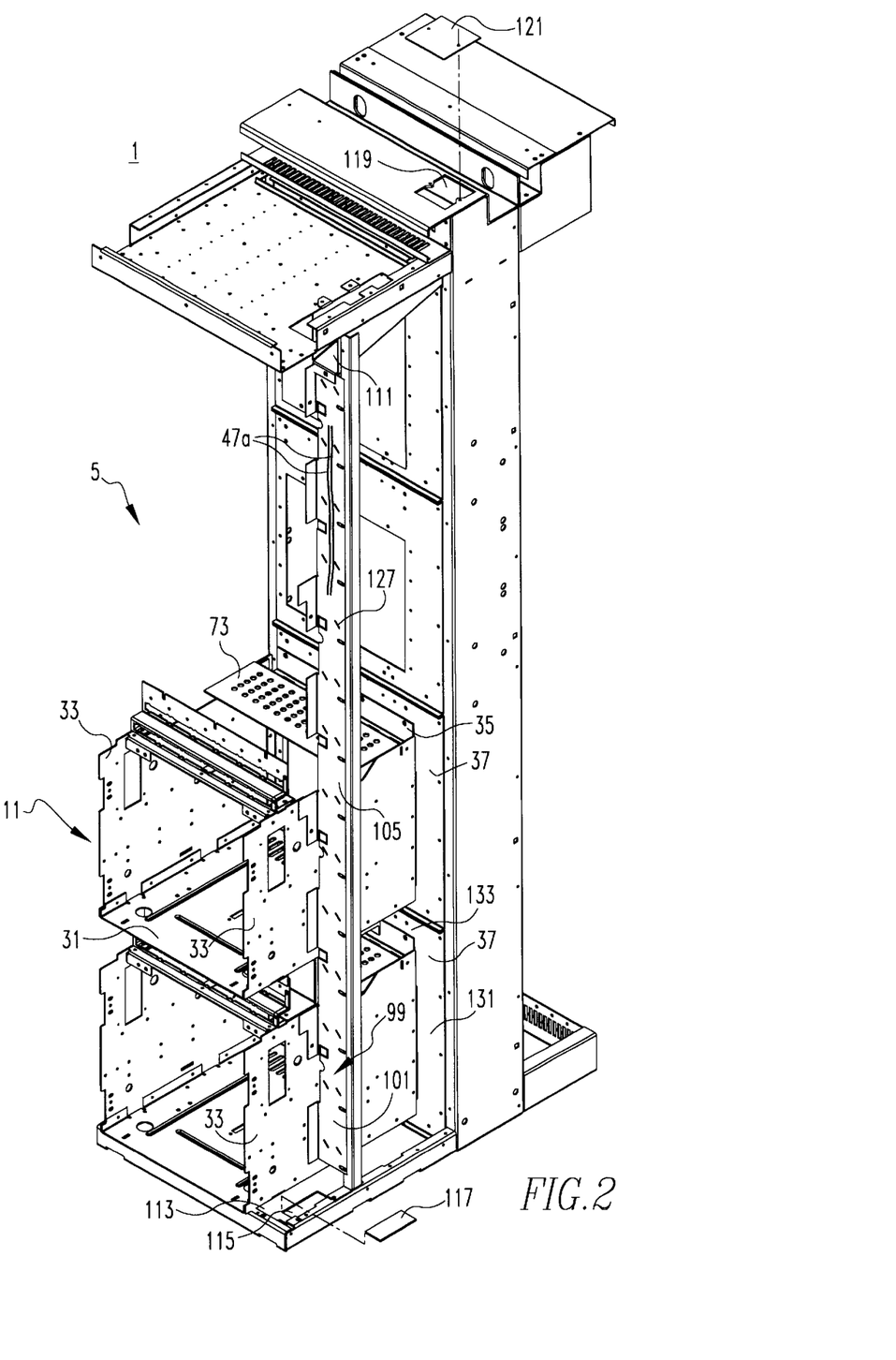
FIG. 2 is a right, front isometric view of a portion of the switchgear assembly of FIG. 1 with parts removed.
Figures 3, 3A:
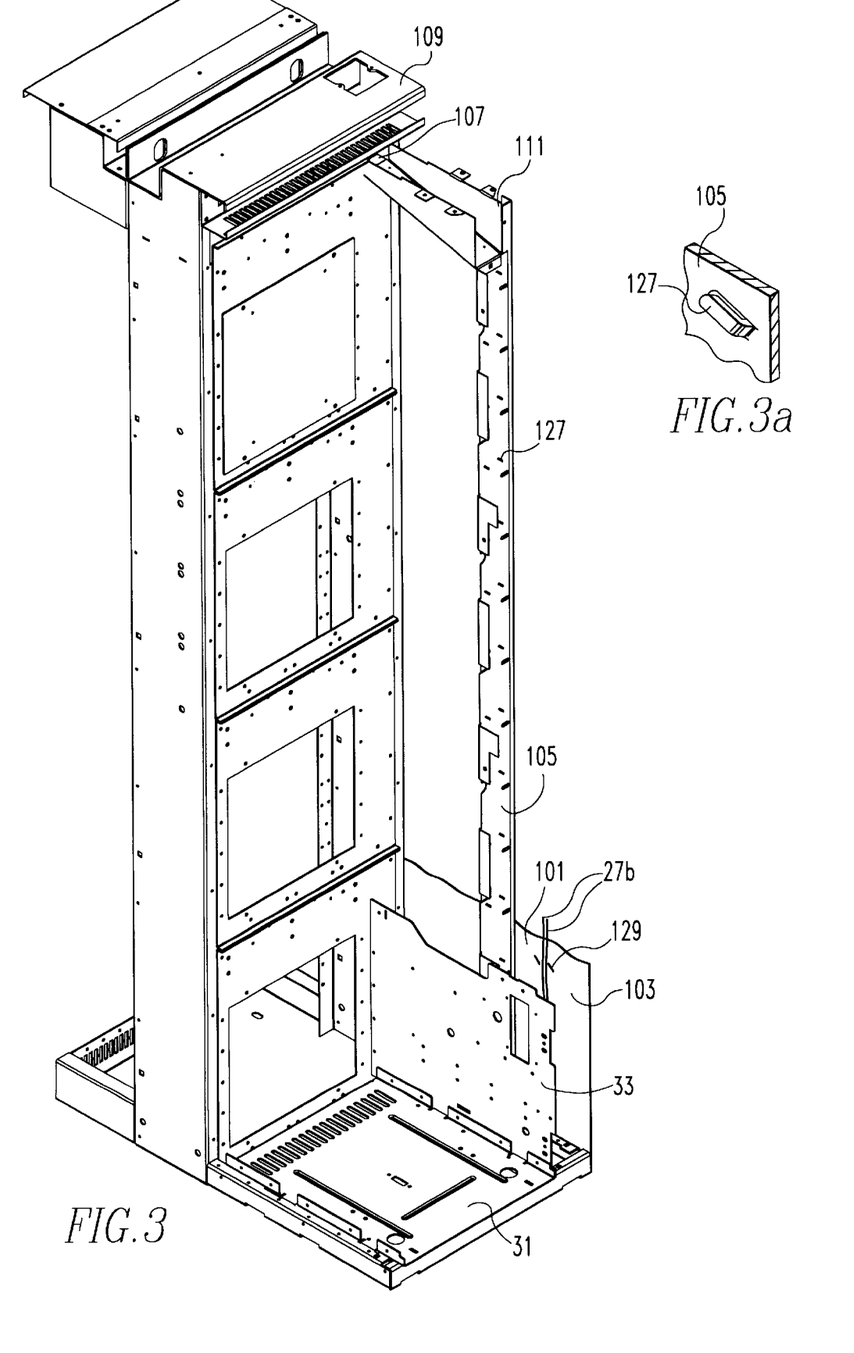
FIG. 3 is a left, front isometric view similar to that of FIG. 2 but with additional parts removed and other parts added.
FIG. 3a is an enlargement of a section of FIG. 3 showing a lanced section of the wall.
Figure 6:
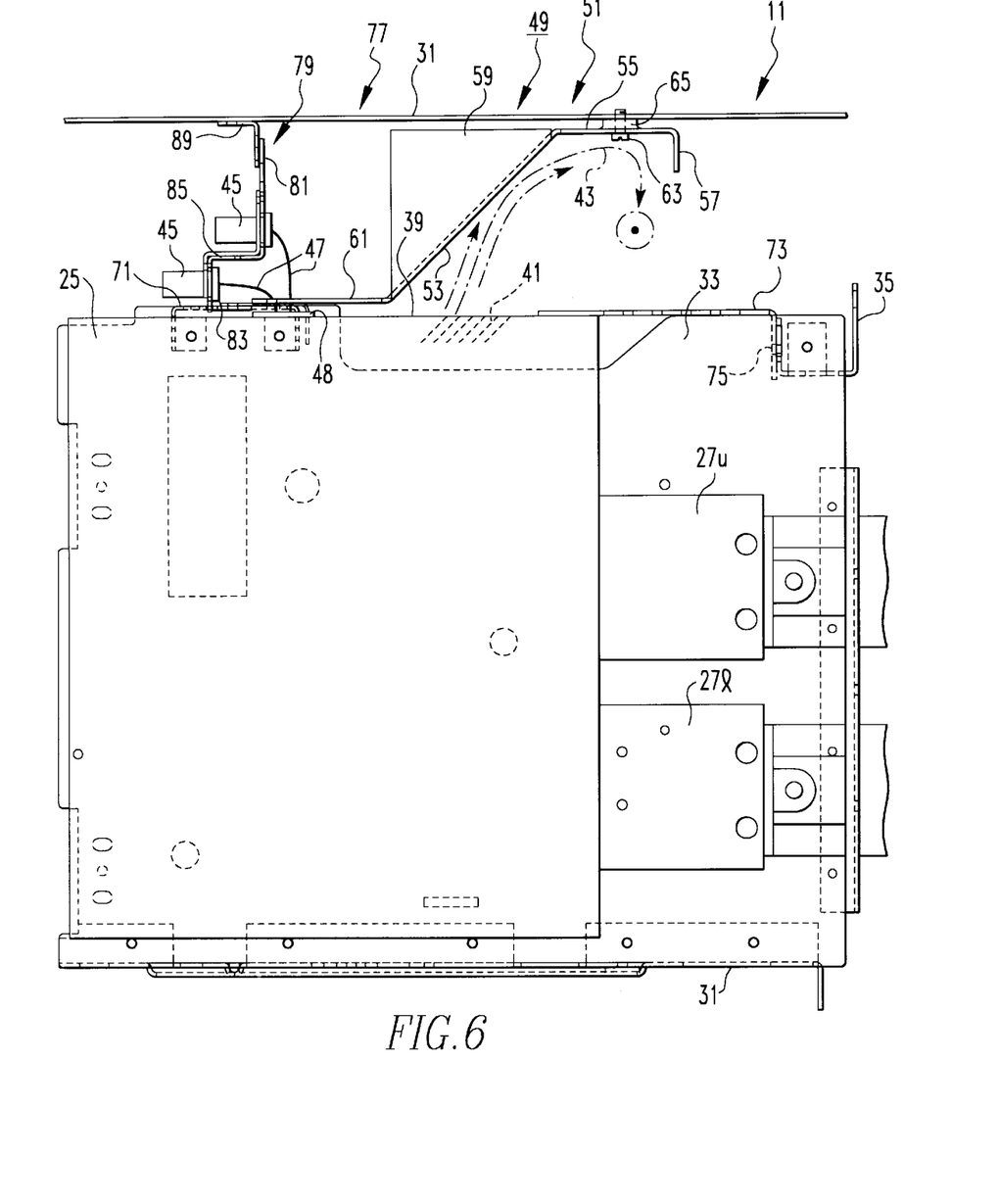
FIG. 6 is a side elevation view in enlarged scale illustrating the relationship between a circuit breaker and the arc shield/wire tray.

Turning to FIGS. 2, 3 and 6, it can be seen that each of the cells 11 has a bottom wall 31 and a pair of side walls 33. A channel member 35 connects the top rear of the side walls 33 and is secured to a panel 37 extending across the rear of the forward compartment 5.

As mentioned, the circuits 25 are rolled in and out of the cells 11 on the cassette (not shown). FIG. 6 illustrates a circuit breaker 25 shown in place within a cell 11. The circuit breaker 25 has at the rear of an upper surface 39 vents 41 for venting arc gases shown by the arrows 43 generated during the interruption of large currents such as those resulting from a short circuit.

Figure 4:
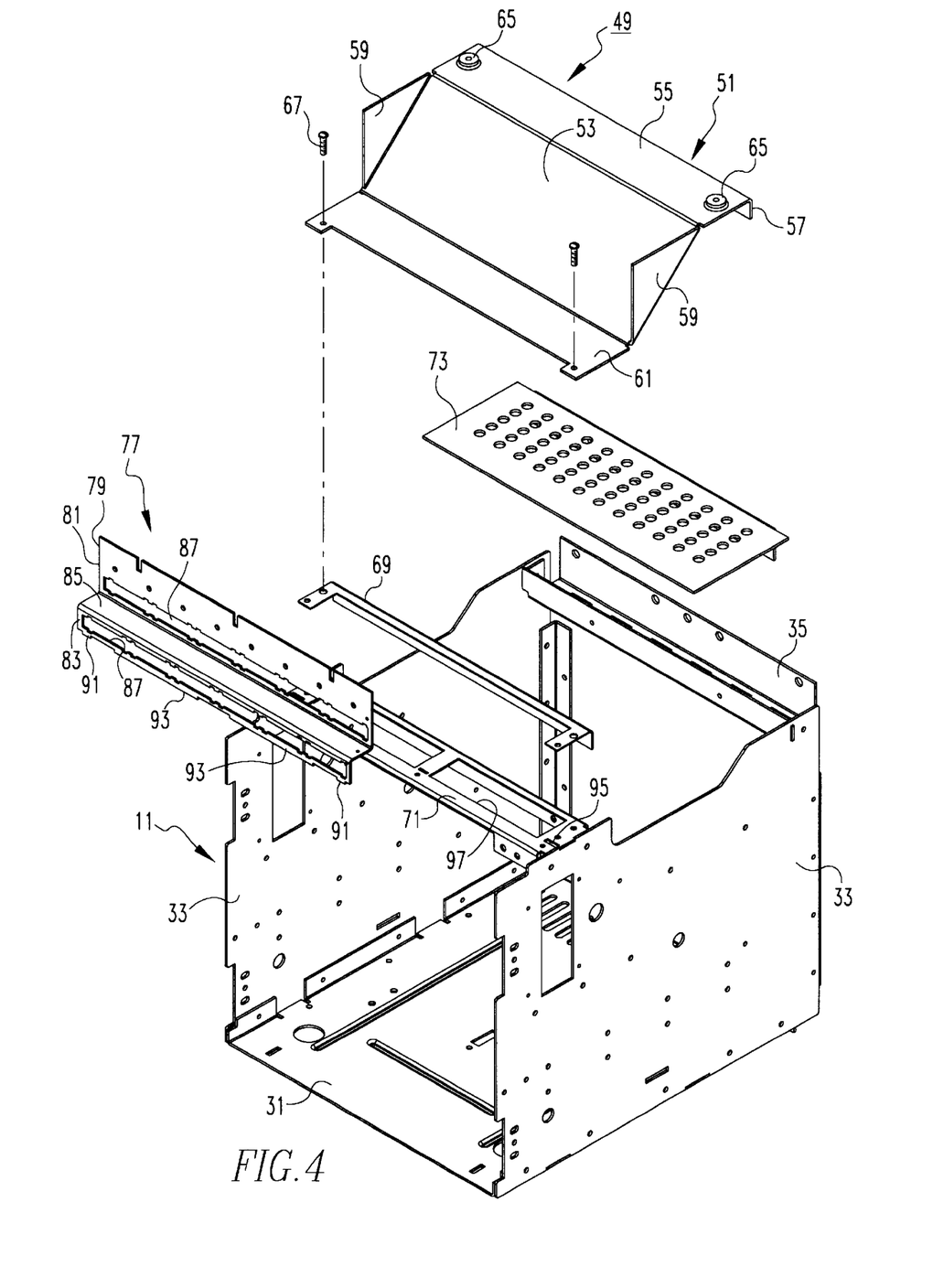
FIG. 4 is an exploded isometric view of a cell with its corresponding arc shield/wire tray.

As also mentioned, terminations 45 for secondary wiring 47 for the circuit breakers 25 are mounted between the circuit breakers. The secondary wiring 47 comprises the control and monitoring wiring for the circuit breakers as opposed to the primary or power conductors connected to the circuit breakers such as the buses 19, the stabs 27u and 27l and the cabling in the rear compartment (not shown). It is important to protect the secondary wiring 47 and terminations 45 from the hot arc gases 43. Thus, an integral arc shield/wire tray 49 is provided. As best seen in FIG. 4, the arc shield/wire tray 49 include an arc shield 51 molded of a resin material such as a polyglass and having an arc deflecting member or panel 53 positioned above the arc vents 41 and inclined upwardly and rearwardly as seen in FIG. 6 to deflect the arc gases 43 rearwardly and away from the secondary wiring 47. The arc shield 51 further includes an integral horizontal section 55 extending rearwardly from the top of the arc deflecting panel and terminating in a downwardly extending lip 57 which extends across the width of the cell 11. The molded arc shield 51 also includes wings 59 on either side of the arc deflecting panel 53 forming side walls. The arc shield also has a lower horizontal wall 61 extending forward from the lower front end of the arc deflecting panel 53. The arc shield 51 is suspended from the bottom walls 31 of the cell 11 above by fasteners 63 extending through molded bosses 65 on the upper horizontal section 55. The forward horizontal panel 61 is secured by fasteners 67 passing through an insulating member to a metal frame 71 extending between the side walls 33 of the cell 11.

As will be noticed from FIG. 6, the downwardly projecting lip 57 on the arc shield stops the rearward flow of the arc gases 43 and tends to deflect them downward toward the quick disconnects 27. In order to prevent these arc gases from causing arcing at the disconnects, a quick disconnect protector in the form of a perforated plate 73 extends horizontally above the quick disconnects and is supported through an integral flange 75 by the channel member 35 extending across the rear of the cell. This results in the arc gases being diverted laterally, mainly out of the plane of FIG. 6, for further handling in a manner to be discussed.

Returning to FIG. 4, the wire tray portion 77 of the arc shield/wire tray 49 utilizes the arc deflecting member or panel 53 as a rear wall, and the forward horizontal panel 61 together with the metal frame 71 as a bottom wall. It also includes a front wall 79. This front wall 79 has an upper vertical section 81 and a lower vertical section 83 connected by an intermediate horizontal section 85 which positions the lower vertical section 83 forward of the upper vertical section 81. Each of the upper vertical section 81 and lower vertical section 83 of the front wall 77 have notched horizontally extending slots 87 in which are mounted in horizontal rows a plurality of the secondary wiring terminal blocks 45 (see FIG. 6). These terminal blocks and the manner in which they are secured in the slots 87 are described in commonly owned U.S.patent application Ser. No. 09/261,796, filed on Mar. 3, 1999. The offset sections 81 and 83 of the front wall 79 position the lower secondary wiring terminal blocks 45 forward of the upper row for easier wiring.

As can be seen from FIG. 6, the front wall 79 is suspended from the bottom wall 31 of the cell 11 above by a mounting bracket 89. Tabs 91 and 93 on the lower vertical section 83 of the front wall 79 engage slots 95 and openings 97 in the metal frame 71 to stabilize the lower end of the front wall 79. The openings 97 in the metal frame 71, which as will be recalled, forms part of the bottom wall of the wire tray 77, accommodates passage of secondary wiring 47 between connectors 48 on the circuit breaker 25 and the secondary wiring terminal blocks 45.

Some of the secondary wiring 47 is routed to other circuit breakers 25 or to the instrumentation usually located in the top most cell 11 in the switchgear cabinet 3. Additional secondary wiring is routed outside of the switchgear cabinet 3 for remote monitoring and control. Referring to FIGS. 2 and 3, a wireway 99 is integrated into the switchgear apparatus 1 in order to organize the routing of the secondary wiring for easy and safe access by technicians, and to protect the secondary wiring. Wireway 99 includes a vertical section or passage 101 in the right forward corner of the compartment 3. This vertical section 101 is formed on one side by the side walls 33 of the cells 11, an outer side panel 103, a transverse vertical wall 105 extending between the side panel 103 and the cell walls 33 and is closed off and made accessible through the cell doors 13 and termination doors 17 (see FIG. 1). This vertical section or passage 101 extends the full height of the right front corner of the forward compartment 5 of the cabinet 3 and joins a horizontal section or passage 107 extending rearward under the top top wall 109 of the cabinet and extends through the middle compartment 7 to the rear compartment 9. A gutter section 111 extending forwardly and downwardly from the horizontal section 107 provides a transition between the horizontal section 107 and the vertical section 101 which more easily accommodates bending of the secondary wiring.

The wireway 99 provides a great deal of flexibility in routing the secondary wiring into and out of the cabinet 3. For instance, as seen in FIG. 2, the floor panel 113 of the forward compartment 5 has a bottom access opening 115 which communicates with the bottom of the vertical section 101 for routing the secondary wiring into and out of the cabinet. If not used, a bottom cover plate 117 is placed over this opening. A top access opening 119 in the top of the cabinet over the middle compartment 7 provides for alternate routing of the secondary wiring and if not used is closed off by a removable top cover 121. A number of side openings 123 in the side panel 103 provides side access at several levels and are blocked off if not used by side covers 125. As another alternative, the wiring can be directed into the rear compartment 9 for rear access. Generally, this would not be recommended as it would expose the technicians servicing the secondary wiring to the power connections also located there.

The secondary wiring 47 includes factory wiring 47a installed before the switchgear apparatus 1 is shipped to the user site (see FIG. 2), and field wiring 47b installed during installation in the field (see FIG. 3). The wireway 99 provides for convenient organization of the two types of wiring. More specifically, first wiring attachments 127 are provided for the factory wiring 47a on the transverse vertical wall 105 forming the rear wall of the vertical section 101 of the wireway. Second wiring attachments 129 are provided on the side wall formed by the side panel 103 for the field wiring 47b. These wiring attachments 127 and 129 can conveniently be in the form of lanced sections of the respective metal panels to which the respective wiring can be secured by ties (not shown).

With the vertical section 101 of the wireway 99 located in the right front corner of the forward compartment 5, this leaves a chamber 131 bounded at the front by the transverse wall 105, at the rear by the panel 37, on the outside by the panel 103 and on the other side by the side walls 33 of the cells. The spaces 133 between the side walls 33 of adjacent cells, allow the arc gases 43 to escape into the chamber 131 where they expand and cool.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A switchgear assembly comprising:
   a cabinet having a forward compartment and at least one additional compartment behind said forward compartment, said forward compartment having a plurality of vertically stacked cells;
   electrical switching apparatus in at least one of said cells and having power connections extending rearward into said at least one additional compartment;
   secondary wiring for said electrical switching apparatus, at least some of which extends outside said cabinet;
   a wireway through which said secondary wiring is routed and having a vertical section in said forward compartment communicating with said cells;
   wherein said vertical section of said wireway extends alongside said cells;
   wherein said vertical section of said wireway extends vertically in a forward corner of said forward compartment;
   wherein said forward compartment has a floor panel with a bottom access opening aligned with said vertical section of said wireway; and
   wherein said floor panel has a removable bottom cover for said bottom access opening.

2. A switchgear assembly comprising:
   a cabinet having a forward compartment and at least one additional compartment behind said forward compartment, said forward compartment having a plurality of vertically stacked cells;
   electrical switching apparatus in at least one of said cells and having power connections extending rearward into said at least one additional compartment;

secondary wiring for said electrical switching apparatus, at least some of which extends outside said cabinet;

a wireway through which said secondary wiring is routed and having a vertical section in said forward compartment communicating with said cellos;

wherein said vertical section of said wireway extends alongside said cells;

wherein said vertical section of said wireway extends vertically in a forward corner of said forward compartment; and wherein said forward compartment has a chamber for expansion of arc gases from said electrical switching apparatus extending vertically behind said vertical section of said wireway.

3. The assembly of claim 2 wherein said cabinet has a transverse wall forming a rear wall of said vertical section of said wireway and a forward wall of said chamber for gas expansion.

4. A switchgear assembly comprising:

a cabinet having a forward compartment and at least one additional compartment behind said forward compartment, said forward compartment having a plurality of vertically stacked cells;

electrical switching apparatus in at least one of said cells and having power connections extending rearward into said at least one additional compartment;

secondary wiring for said electrical switching apparatus, at least some of which extends outside said cabinet;

a wireway through which said secondary wiring is routed and having a vertical section in said forward compartment communicating with said cells;

wherein said vertical section of said wireway extends alongside said cells;

wherein said vertical section of said wireway extends vertically in a forward corner of said forward compartment; and wherein said wireway has openings into said cells.

5. A switchgear assembly comprising;

a cabinet having a forward compartment and at least one additional compartment behind said forward compartment, said forward compartment having a plurality of vertically stacked cells;

electrical switching apparatus in at least one of said cells and having power connections extending rearward into said at least one additional compartment;

secondary wiring for said electrical switching apparatus, at least some of which extends outside said cabinet;

a wireway through which said secondary wiring is routed and having a vertical section in said forward compartment communicating with said cells;

wherein said vertical section of said wireway extends alongside said cells;

wherein said vertical section of said wireway extends vertically in a forward corner of said forward compartment; and wherein said wireway includes a horizontal section communicating with said vertical section and extending rearward into said at least one additional compartment.

6. The assembly of claim 5 wherein said cabinet has a top wall and said horizontal section of said wireway extends under said top wall.

7. The assembly of claim 6 wherein said top wall has a top access opening for passage of said secondary wiring into said horizontal section of said wireway.

8. The assembly of claim 7 wherein said top wall has a removable top access opening cover for said top access opening.

9. The assembly of claim 6 wherein said forward compartment has a chamber for expansion of arc gases from side electrical switching apparatus extending vertically behind said vertical section of said wireway.

10. The assembly of claim 6 wherein said at least one additional compartment is a middle compartment and said cabinet has a rear compartment behind said middle compartment, said horizontal section of said wireway extending further rearward through said middle compartment to said rear compartment.

11. A switchgear assembly comprising:

a cabinet having a forward compartment and at least one additional compartment behind said forward compartment, said forward compartment having a plurality of vertically stacked cells;

electrical switching apparatus in at least one of said cells and having power connections extending rearward into said at east one additional compartment;

secondary wiring for said electrical switching apparatus, at least some of which extends outside said cabinet;

a wireway through which said secondary wiring is routed and having a vertical section in said forward compartment communicating with said cells;

wherein said wireway includes a horizontal section communicating with said vertical section and extending rearward into said a least one additional compartment; and wherein said wireway includes an inclined gutter section providing a transition between said vertical section and said horizontal section.

12. The apparatus of claim 11 wherein said at least one additional compartment is a middle compartment and said cabinet has a rear compartment behind said middle compartment, said horizontal section of said wireway extending further rearward through said middle compartment to said rear compartment.

13. A switchgear assembly comprising:

a cabinet having a forward compartment and at least one additional compartment behind said forward compartment, said forward compartment having a plurality of vertically stacked cells;

electrical switching apparatus in at least one of said cells and having power connections extending rearward into said at least one additional compartment;

secondary wiring for said electrical switching apparatus, at least some of which extends outside said cabinet;

a wireway through which said secondary wiring is routed and having a vertical section in said forward compartment communicating with said cells; and wherein said secondary wiring includes factory-installed wiring and field-installed wiring, and said wireway has a first wall with first attachment means for attaching said factory-installed wiring and a second wall with second attachment means for attaching said field-installed wiring.

14. The assembly of claim 13 wherein said first and second attachment means comprise lanced sections on said first wall and said second wall.

* * * * *